United States Patent [19]
Perlini

[11] Patent Number: 4,570,971
[45] Date of Patent: Feb. 18, 1986

[54] MOTOR VEHICLE SUSPENSION

[76] Inventor: Roberto Perlini, 37047 San Bonifacio-Locara, Italy

[21] Appl. No.: 592,372

[22] Filed: Mar. 22, 1984

[30] Foreign Application Priority Data

Jan. 16, 1984 [IT] Italy ............... 67038 A/84

[51] Int. Cl.⁴ .............................................. B60G 5/00
[52] U.S. Cl. .................................... 280/680; 280/686
[58] Field of Search ............... 280/676, 677, 678, 680, 280/683, 686, 715; 180/9.54, 9.56, 9.58, 9.6

[56] References Cited

U.S. PATENT DOCUMENTS

| 2,463,627 | 3/1949 | Jonkmoff | 280/686 |
| 2,795,434 | 6/1957 | Gouirand | 280/683 |
| 4,331,348 | 5/1982 | Raidel | 280/686 |
| 4,460,196 | 7/1984 | Perlini | 280/676 |

FOREIGN PATENT DOCUMENTS

| 483386 | 9/1929 | Fed. Rep. of Germany | 280/677 |
| 2060814 | 5/1981 | United Kingdom . | |

Primary Examiner—Joseph F. Peters, Jr.
Assistant Examiner—Kenneth R. Rice
Attorney, Agent, or Firm—Harding, Earley, Follmer & Frailey

[57] ABSTRACT

A suspension, particularly for coupled axles of industrial vehicles, comprising a first resilient center body acted upon by a pair of control arms carried by a pair of elements rotatably coupled to a center pin on the chassis of the vehicle, and second resilient lateral bodies formed of quarter elliptic springs supported by the rotatably coupled elements and having a degree of resiliency lower than that of the resilient center body so that in any loading condition the suspension will provide a certain degree of residual resiliency predetermined by design.

6 Claims, 6 Drawing Figures

U.S. Patent  Feb. 18, 1986  Sheet 1 of 3  4,570,971
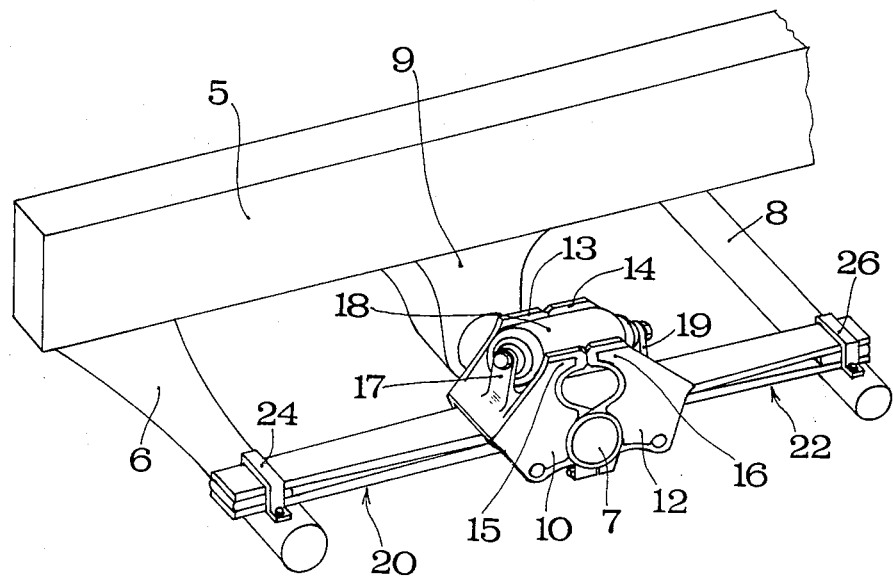
FIG. 1
FIG. 4
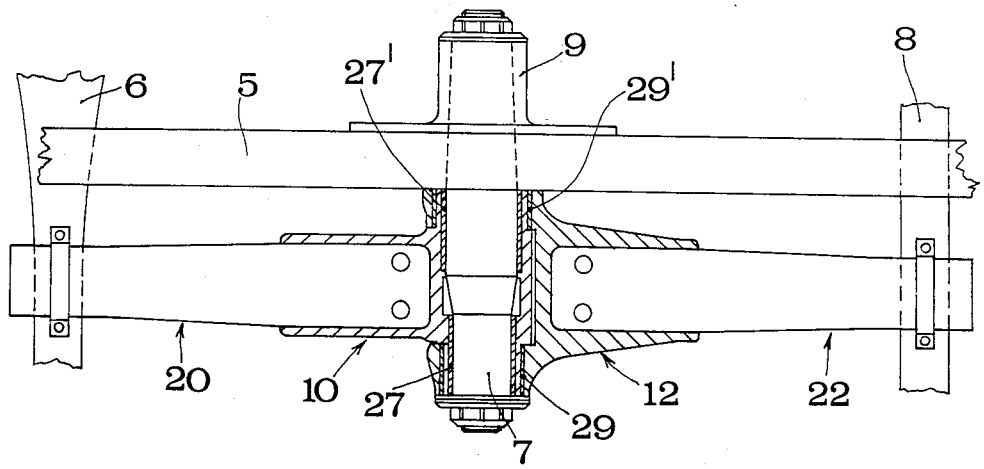

MOTOR VEHICLE SUSPENSION

This invention relates to a suspension for motor vehicles with elements having a different degree of resiliency. More particularly, the invention relates to a suspension which is advantageously applicable to coupled axles of industrial vehicles.

The most simple case of a suspension for motor vehicles is that of leaf springs which are composed of several steel leaves of high strength and flexibility, forming a "pack" of variable cross section. The value of the load P which can be supported by each leaf spring is a linear function of the cross section, the number of leaves and their unitary strength. It follows that with the same material the load P that can be supported by the leaf spring depends on the number of leaves.

The result is that with increasing load the number of the leaves increases and the "flexibility" of the pack, i.e. "the elastic response of the spring to the applied loads", diminishes proportionately.

It is thus evident that in vehicles designed to carry heavy loads, the suspensions are responsive—with a limited elongation—only when the vehicle for which they are dimensioned is loaded and furnish a poor response at partial load and no response at tare weight.

It is also to be considered that in the case of several adjacent axles, the suspension must be designed to permit distribution of the load over the axles even if one axle is lifted with respect to the adjacent one. This effect, which may be called rocking lever effect, is obtained by providing a swing center of the system, about which the system may rotate while keeping the axles in contact with the ground to which the overall weight supported thereby is transmitted in the proportion determined by the funicular polygon of forces.

This is the case of the cantilever suspension in which large packs of leaf springs absorb the loading stress whereas the longitudinal and transverse stresses are absorbed by appropriate bars so that the entire system can rotate about a center pin between the axles.

However, as the suspension systems of the cantilever and similar types are designed for large carrying capacities, they have very little flexibility and almost no elastic response when the vehicle is empty; they limit the speed of the vehicle to very low values when running on uneven ground and afford no driving comfort on any ground and at any speed.

Also suspension systems are known which have rigid arms connected on one side directly to the axles or wheels and pivotally mounted at the center for rotation about a pin and acting on a resilient body whose deformation produced by the oscillation of the arms about the pin causes the suspension effect.

An example of this type of suspension is disclosed in U.S. Pat. No. 2,795,434 and Italian patent application No. 68,672-A/81 filed Dec. 23, 1981 in the name of the same Applicant.

Although the suspension systems with rigid arms from certain aspects constitute an improvement over the cantilever suspension system, particularly with regard to the suspension described in Italian patent application No. 68,672-A/81 which has introduced an improved construction, they are not completely satisfactory because, as there is flexibility only in the center resilient body, the suspension effect is exhausted when said body is at the end of its travel.

Thus, it can be said that the known suspensions designed mainly for vehicles with several axles and for heavy loads have not fulfilled all the functions that a suspension basically is called upon to fulfill and in particular they are not capable of proportioning the response of the elastic body to guarantee a regular operation under all foreseeable loading and running conditions.

SUMMARY OF THE INVENTION

It is an object of the present invention to provide a suspension for motor vehicles which eliminates or reduces the disadvantages of the known systems and is capable of performing all the tasks of a suspension and in particular of ensuring a proportionate resilient response under all possible loading conditions.

This and other objects and advantages of the invention which will appear from the following description, are achieved according to the invention by a suspension system for motor vehicles, comprising for each side of the vehicle a first center resilient means acted upon by a pair of control arms provided with articulated heads supported by a pair of elements rotatably coupled to a center pin on the chassis of the vehicle, characterized by comprising second resilient means constituted by a pair of quarter elliptic springs having a degree of resiliency lower than that of said first resilient means and supported laterally by said elements, the free ends of said quarter elliptic springs being supported by unsprung members of the vehicle.

Thus, the suspension according to the invention is formed by the combination of several resilient means having a different degree of resiliency and differs from the known suspensions mainly in that when the other suspensions, in the condition of the "end of compression", have exhausted their range of resilient deformation and behave in the manner of a rigid connection, in the present suspension the lateral springs enter into operation, which act according to a predetermined curve of resiliency and behave like a suspension independent from the other elements which have already fulfilled their task.

BRIEF DESCRIPTION OF THE DRAWINGS

FIG. 1 is a schematic perspective view of a suspension according to the invention as applied to coupled axles of an industrial vehicle;

FIG. 4 is a part sectional plan view of the suspension of FIG. 3;

DESCRIPTION OF PREFERRED EMBODIMENT

Figure 3:
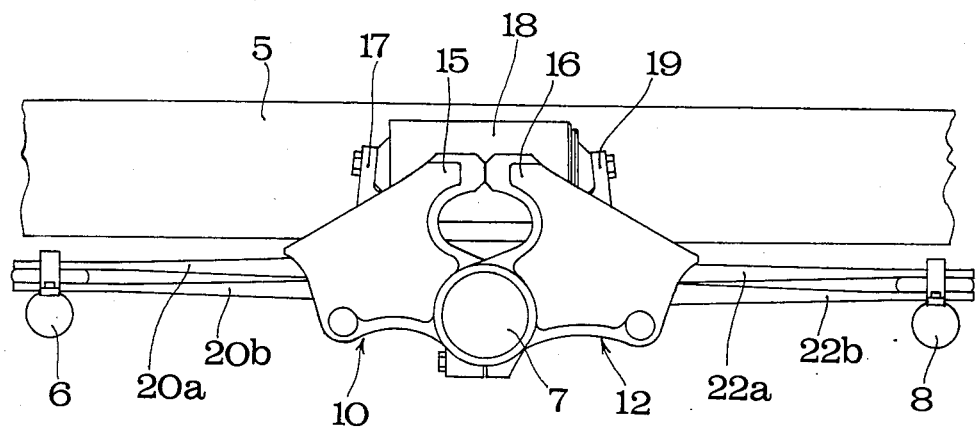
FIG. 3 is a side elevational view similar to FIG. 2, but with the suspension in a situation of operation corresponding to full loading of the vehicle.
Figure 2:
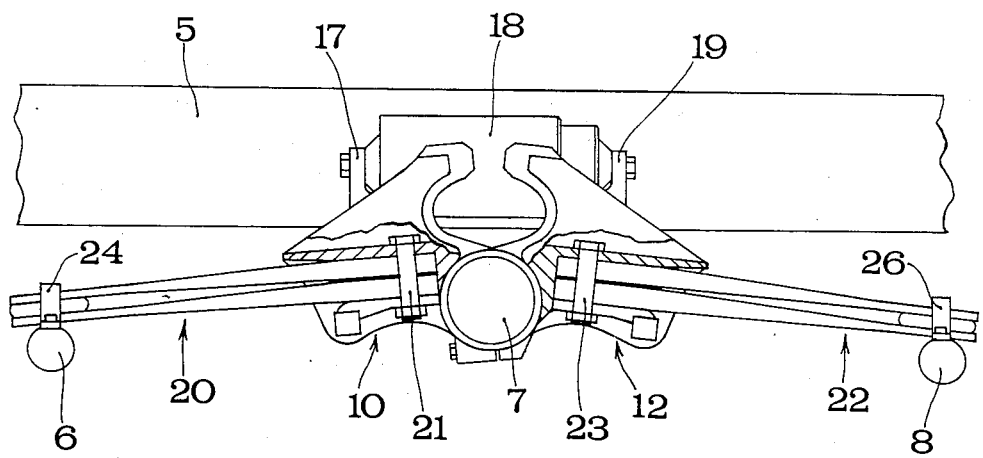
FIG. 2 is a side elevational view, partly in section, of the suspension of FIG. 1, illustrating a situation of operation at low loading of the vehicle.

As shown in FIG. 1, indicated by 5 is a section of a longitudinal side beam forming part of the side of a chassis of an industrial vehicle, 6 and 8 denote coupled axles of the same vehicle and 7 denotes a center pin of the chassis, this center pin being supported by a bracket 9 (FIG. 4) and serving for pivotal mounting of the suspension. It is to be understood that the same structure with the same components that will be described hereinafter is identically reproduced on the opposite side of the chassis.

The wheels and other structural details of the unsprung members are not shown because they do not form part of the present invention and are known to one skilled in the art. Two approximately fork-shaped oscillatable elements 10, 12 are rotatably mounted on the center pin 7 of the chassis. Legs 13, 15 of fork-shaped element 10 and legs 14, 16 of fork-shaped element 12 extend in parallel toward one another to form a limit stop for the elements 10 and 12, as will be described hereinafter.

Figure 5:
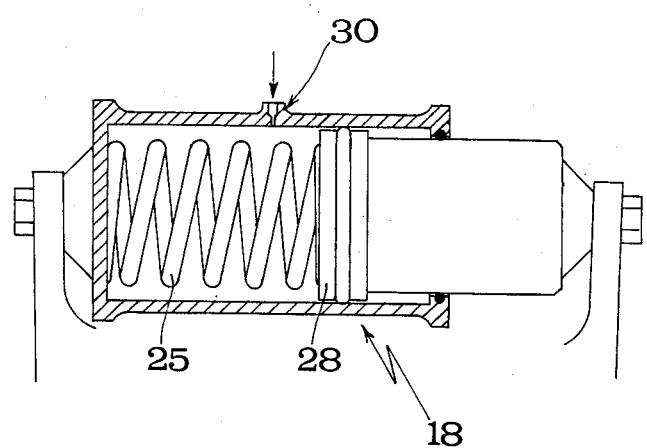
FIG. 5 is a view, partly in axial section, of an embodiment of a portion of the suspension of FIG. 1.

Each rotatable element 10, 12 carries a control arm 17, 19 which extends upwardly from the element between the legs 13, 15 and 14, 16, respectively. The control arms 17 and 19 are provided with articulated heads not shown in detail, as they are known, and carry centrally a first center resilient means 18 which may be constituted by a pneumatic or oleo-pneumatic cylinder or by a spring or by other resilient systems. Preferably it is constituted by a resilient means having several degrees of resiliency such as a cylinder containing both a gaseous elastic body, for example air, and a solid elastic body, for example, a spring. One embodiment of the center resilient means 18 is shown in FIG. 5 where there is a cylinder which contains a spring 25 and which, if required, can be filled with a gaseous resilient means through a hole 30. By sealingly mounting a piston 28 in the cylinder one obtains a resilient response which may follow the curve of resiliency of the spring or of the compressed gas depending upon the characteristics and conditions of the load.

Another example of a resilient means having several degrees of resiliency is constituted by the oleopneumatic cylinder forming the subject matter of Italian patent application No. 69,018-A/79 filed on Oct. 17, 1979 in the name of the same Applicant.

Figure 6:
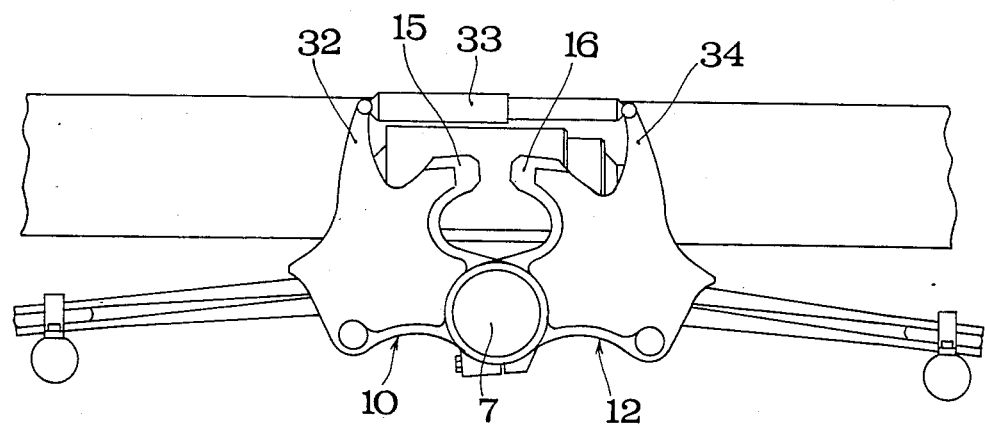
FIG. 6 illustrates in elevation an embodiment of the suspension including a shock absorber.

The oscillation of the center resilient means 18 may be damped by a shock absorber 33 as shown, for example, in FIG. 6. The oscillatable elements 10, 12 are provided with extensions 32, 34 extending beyond the legs 15, 16 to support the shock absorber 33.

Considering again FIGS. 1 to 4, it will be seen that the elements 10, 12 mounted for oscillation on pin 7, according to the invention, support laterally a pair of springs 20, 22 in the form of one or more steel sheets adapted to form leaf springs: thus, the springs 20, 22 may be called "quarter elliptic springs". The quarter elliptic springs 20, 22 have a degree of resiliency which is predetermined by design and is lower than that of the first resilient means 18, i.e. they are less "flexible" than the first resilient means. In the embodiment shown in the drawings, the quarter elliptic springs 20, 22 are each constituted by two steel sheets 20a, 20b and 22a, 22b (FIG. 3) secured to the elements 10, 12 by screws 21, 23 (FIG. 2) and nuts.

The free ends of quarter elliptic springs 20, 22 are supported on axles 6 and 8 and secured thereto by brackets 24, 26.

The portion of FIG. 4 shown in section illustrates the structure of the elements 10, 12 which permits them to be coupled for rotation about pin 7. As can be seen, element 10 is directly supported by pin 7 with the interposition of members 27, 27' adapted to permit their relative movement, as is known in the art, whereas element 12 is rotatably coupled to element 10 with the interposition of similar members 29, 29' adapted to permit their relative movement.

The operation of the suspension is as follows:

(a) Under conditions of minimum load (FIG. 2), the resilient response to the applied load is given:
mainly by the first resilient means 18. If the latter is a body having several degrees of flexibility, according to the preferred embodiment, the resilient response follows its first curves of flexibility;
also by the quarter elliptic springs 20, 22 on the initial values of the corresponding curve of flexibility and also a function of the cycle of resilient hysteresis of the entire system.

(b) Under conditions of medium load (still FIG. 2), the resilient response involves both systems, with prevalence of the center resilient body. If the latter is a body having several degrees of flexibility, the resilient response follows the second curve of flexibility while the quarter elliptic springs 20, 22 oscillate on low frequency values.

(c) Under conditions of maximum load, the first resilient means 18 is excluded and operates toward the end limit of its mechanical compression with more reduced elongations and in the high pressure range. The situation of exclusion of the first resilient means is shown in FIGS. 1 and 3 wherein the legs 13, 15 and 14, 16 of elements 10 and 12 abut one another.

The main portion of the resilient response—which is such as to maintain the response value constant over the entire range of operation as the load varies—is given by the quarter elliptic springs 20, 22 to which the resultant of response is transmitted when the center body 18 closes at the end of travel and becomes a rigid connection element.

The three conditions examined above have been cited to exemplify the operation of the system which in reality operates continuously through its resilient elements. In fact, although it is true that the three conditions are in reality different since the vehicle is either at tare weight or at half load or at complete load, it is also true that the effects of the external forces such as, for example, those introduced by a deep hole passed at a certain speed, may create, also when running empty, instantaneous situations similar to the effects of running under load. This requires the system to have a certain promptness of resilient response which may be obtained, without risking lability of the assembly, only in the presence of several resilient responses attainable by the simultaneous presence of a plurality of springs having different flexibilities without the system ever reaching the condition of being blocked at the end of mechanical compression, evidently in the range of operation defined by the minimum and maximim values of loads that can be applied to the system.

Summing up, the main advantage of the suspension according to the invention consists in that in the field of definition of loads it is always capable of providing a determined degree of residual flexibility predetermined by design. In fact, the entire system is constituted by "springs" having a different resilient response as the elements 10 and 12 have the only function of assembling the resilient elements of the system.

Although a preferred embodiment of the invention has thus been described in detail and illustrated in the accompanying drawings, it is to be understood that the invention is not limited to this precise embodiment and that numerous changes and modifications obvious to one skilled in the art may be made therein without departing from the scope of the invention as defined by the appended claims.

I claim:

1. A motor vehicle suspension having plural resilient elements having different degrees of resiliency, comprising for each side of the motor vehicle a first center resilient means acted upon by a pair of control arms provided with articulated heads supported by a pair of elements rotatably coupled to a center pin on the chassis of the motor vehicle, characterized by second resilient means having a degree of resiliency lower than that of said first resilient means, said second resilient means being formed of a pair of springs supported laterally by said rotatably coupled elements, the ends of said springs being supported by unsprung members of the motor vehicle.

2. A motor vehicle suspension as claimed in claim 1, wherein said springs forming said second resilient means are quarter elliptic springs.

3. A motor vehicle suspension as claimed in claim 1, wherein said first resilient means is formed by a resilient body having several degrees of resiliency.

4. A motor vehicle suspension as claimed in claim 1, wherein said first resilient means is a resilient body having several degrees of resiliency and constituted by a cylinder containing compressed gas and a spring.

5. A motor vehicle suspension as claimed in claim 1, wherein said elements rotatably coupled to said center pin on the chassis have legs facing one another and adapted to abut against one another when said first resilient means is at the end of its travel.

6. A motor vehicle suspension as claimed in claim 1, wherein said elements rotatably coupled to said center pin on the chassis have parallel legs facing one another in pairs and adapted to abut against one another when said first resilient means is at the end of its travel, and said legs have extensions for supporting a shock absorber therebetween.

* * * * *